(12) United States Patent
D'Hoye et al.

(10) Patent No.: US 7,827,147 B1
(45) Date of Patent: Nov. 2, 2010

(54) SYSTEM AND METHOD FOR AUTOMATICALLY REDISTRIBUTING METADATA ACROSS MANAGERS

(75) Inventors: Koen D'Hoye, Lochristi (BE); Joris Custers, Lochristi (BE); Wim De Wispelaere, Lochristi (BE)

(73) Assignee: Data Center Technologies, Cupertino, CA (US)

( * ) Notice: Subject to any disclaimer, the term of this patent is extended or adjusted under 35 U.S.C. 154(b) by 246 days.

(21) Appl. No.: 11/694,631

(22) Filed: Mar. 30, 2007

(51) Int. Cl.
*G06F 17/00* (2006.01)
*G06F 7/00* (2006.01)

(52) U.S. Cl. .................. 707/652; 707/661; 707/713; 707/769; 709/203

(58) Field of Classification Search ............ None
See application file for complete search history.

(56) References Cited

U.S. PATENT DOCUMENTS

| | | | |
|---|---|---|---|
| 6,061,692 A | 5/2000 | Thomas et al. | |
| 6,081,812 A | 6/2000 | Boggs et al. | |
| 6,721,907 B2 | 4/2004 | Earl | |
| 6,862,692 B2 | 3/2005 | Ulrich et al. | |
| 6,990,656 B2 | 1/2006 | Ersek et al. | |
| 7,072,807 B2 | 7/2006 | Brown et al. | |
| 7,092,977 B2* | 8/2006 | Leung et al. | 707/205 |
| 7,240,100 B1* | 7/2007 | Wein et al. | 709/214 |
| 7,272,613 B2 | 9/2007 | Sim et al. | |
| 7,383,288 B2 | 6/2008 | Miloushev et al. | |
| 7,478,113 B1 | 1/2009 | De Spiegeleer et al. | |
| 2004/0153458 A1* | 8/2004 | Noble et al. | 707/10 |
| 2006/0089954 A1* | 4/2006 | Anschutz | 707/202 |
| 2007/0198601 A1* | 8/2007 | Prahlad et al. | 707/201 |

* cited by examiner

*Primary Examiner*—Greta L Robinson
*Assistant Examiner*—James J Wilcox
(74) *Attorney, Agent, or Firm*—Rory D. Rankin; Meyertons, Hood, Kivlin, Kowert & Goetzel, P.C.

(57) ABSTRACT

System and method for managing metadata. A computer system includes one or more hosts, each host having an associated backup agent. Each backup agent conveys data from its associated host to a storage pool and stores metadata associated with the data in a metabase. In response to detecting that a first metabase meets a first condition, the system identifies a backup agent that has stored metadata in the first metabase and redistributes at least a portion of the metadata to a second metabase. In one embodiment, the first condition comprises detecting the amount of metadata stored in the first metabase reaching a threshold value. In a further embodiment, the metadata comprises entries, each of which corresponds to a data file. Each entry includes a fingerprint that is derived from and identifies the corresponding data file. The fingerprints identifying the data files may be encrypted.

15 Claims, 9 Drawing Sheets

SYSTEM AND METHOD FOR AUTOMATICALLY REDISTRIBUTING METADATA ACROSS MANAGERS

BACKGROUND OF THE INVENTION

1. Field of the Invention

This invention relates to computer systems and, more particularly, to backup and restoration of data within computer systems.

2. Description of the Related Art

There is an increasing need for organizations to protect data that resides on a variety of client devices via some type of backup mechanism. For example, numerous client devices may be coupled to a network to which one or more backup servers are also coupled. The backup servers may include or be further coupled to one or more disk storage devices, tape drives, or other backup media. A backup agent on each client device may convey data files to the backup server for storage on backup media according to a variety of schedules, policies, etc. For example, large backup datasets may be moved from a client device to a media server configured to store data for later retrieval, thereby protecting data from loss due to user error, system failure, outages, and disasters, etc. as well as archiving information for regulatory compliance, workflow tracking, etc.

In order to minimize the size of storage pools required to store backup data, Single Instance Storage (SIS) techniques are sometimes employed at each backup location. In SIS techniques, data is stored in segments, with each segment having a fingerprint that may be used to unambiguously identify it. For example, a data file may be segmented, and a fingerprint calculated for each segment. Duplicate copies of data segments are replaced by a single instance of the segment and a set of references to the segment, one for each copy. In order to retrieve a backup file, a set of fingerprints is sent to a backup server, where it is compared to the fingerprints of data stored in a storage pool. For each matching fingerprint, a data segment is retrieved. The resulting segments are re-assembled to produce the desired file.

In order to make data more readily available, one or more metadata managers may store metadata describing a single-instance storage pool in a database that is separate from the SIS pool itself. Such a database may be referred to as a metabase. Metadata managers may be located on separate hosts or co-located on hosts that include a database server. Accordingly, one or more metabases hosted in a variety of locations may contain data describing each SIS pool. Typically, metadata from a given backup agent is stored in only one metabase. As new backup agents are brought into a system, they may be assigned to either an existing metabase or a new metabase if the existing metabases are nearing their full capacity. Unfortunately, if a backup agent is assigned to a given metabase that is nearing full capacity, there may not be sufficient space available to store more metadata from the backup agent. One conventional approach to this problem is for a system administrator to redistribute backup agents among the available metabases. However, the expense and time involved in having a system administrator perform redistribution is undesirable. Further, additional time and effort is necessary to ensure that metadata from a given agent fits in a given metabase. These issues may also arise when new agents are added to a system.

In view of the above, an effective system and method for redistributing metadata among metabases that accounts for these issues is desired.

SUMMARY OF THE INVENTION

Various embodiments of a computer system and methods are disclosed. In one embodiment, a computer system includes one or more hosts, each host having an associated backup agent. Each backup agent is configured to convey data from its associated host to a storage pool and store metadata associated with the data in a metabase. In response to detecting that a first metabase meets a first condition, the system is configured to identify a backup agent that has stored metadata in the first metabase and redistribute at least a portion of the metadata to a second metabase. In one embodiment, the first condition comprises detecting the amount of metadata stored in the first metabase reaching a threshold value.

In a further embodiment, the metadata comprises entries, each of which corresponds to a data file. Each entry includes a file fingerprint that is derived from and unambiguously identifies the corresponding data file. In one embodiment, the file fingerprints identifying the data files are encrypted.

In a still further embodiment, a storage pool is configured to segment a first file into data segments, identify each data segment by a data segment fingerprint, store the data segments, and de-duplicate the data segments against other data segments stored in the storage pool. The storage pool us further configured to maintain a table of entries, a first entry including a file fingerprint of the first file and data segment fingerprints corresponding to the first file's data segments. In one embodiment, the storage pool is further configured to de-duplicate the first entry against other table entries.

In a further aspect of the invention, a first host associated with the identified backup agent is configured to store data in a plurality of folders. A first sub-portion of metadata that is associated with data from a first folder is included in the metadata and a second sub-portion of metadata that is associated with data from the first folder is not redistributed from the first metabase.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
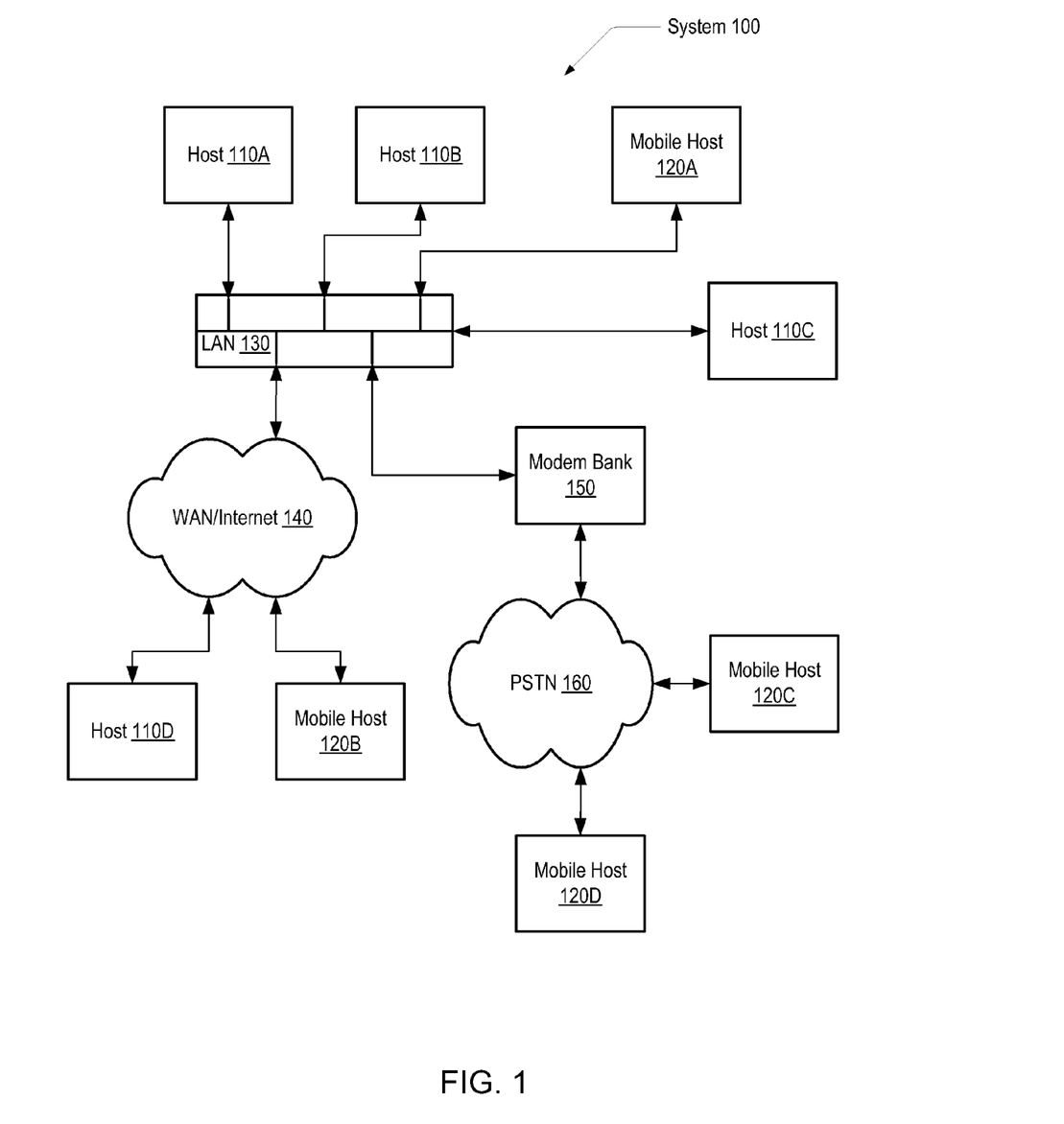
FIG. 1 illustrates one embodiment of a computer system.

FIG. 1 illustrates one embodiment of a computer system 100. As shown, system 100 includes hosts 110A-110D and mobile hosts 120A-120D interconnected through a network that includes a local area network (LAN) 130 coupled to a wide area network WAN/Internet 140 and a modem bank 150, which is in turn coupled to a public switched telephone network (PSTN) 160. Hosts 110A-110D are representative of any number of stationary computers. Mobile hosts 120A-120D are representative of any number of mobile client computing devices such as laptops, handheld computers, etc. Both hosts and mobile hosts may operate as peers in a peer-to-peer configuration or as clients and servers in a client/server configuration.

In alternative embodiments, the number and type of hosts, LANs, WANs, and modem banks is not limited to those shown in FIG. 1. Almost any number and combination of server, desktop, and mobile hosts may be interconnected in system 100 via various combinations of modem banks, direct LAN connections, wireless connections, WAN links, etc. Also, at various times one or more hosts may operate offline. In addition, during operation, individual host connection types may change as mobile users travel from place to place connecting, disconnecting, and reconnecting to system 100.

Figure 2:
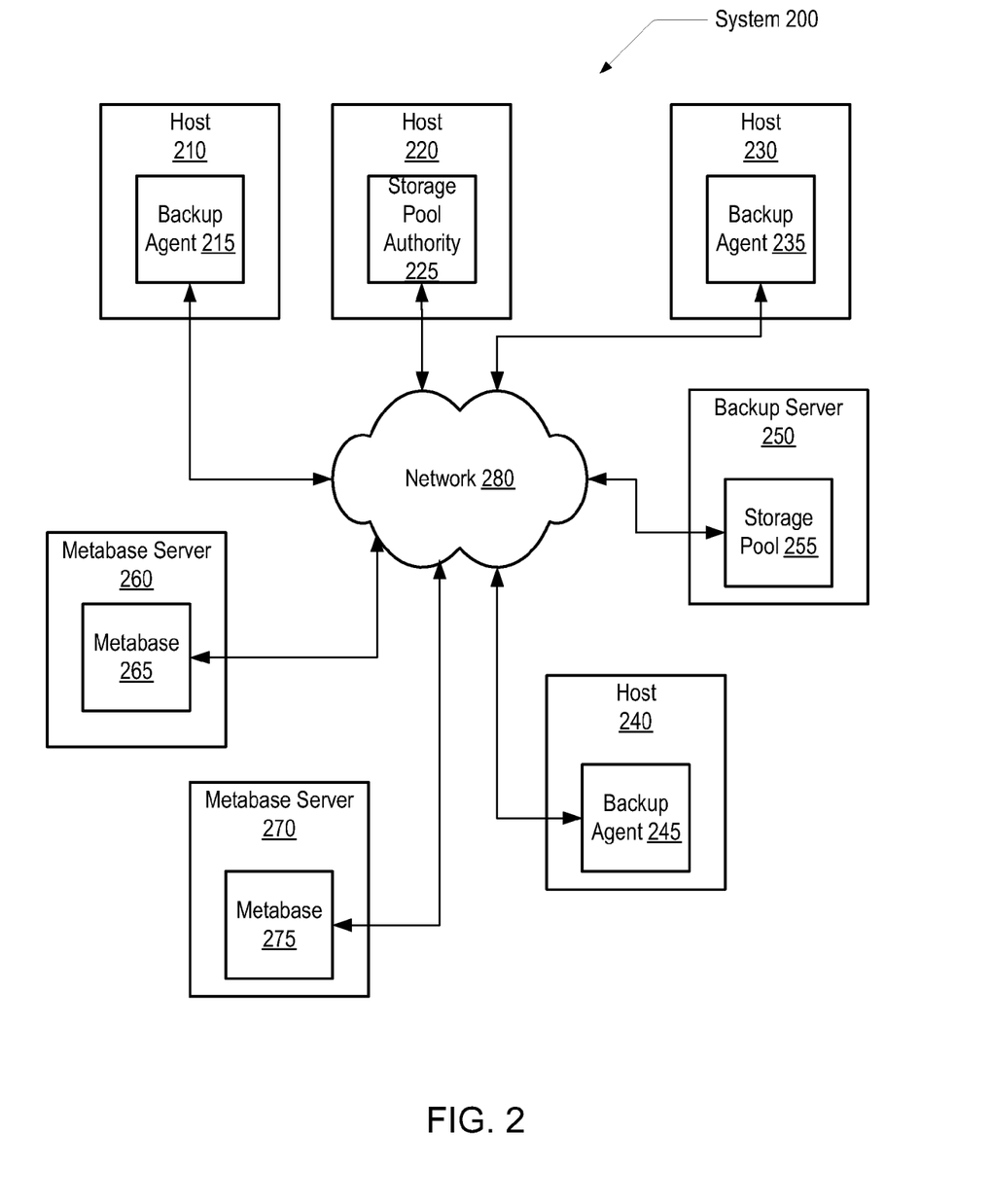
FIG. 2 is a generalized block diagram of one embodiment of a backup system that may operate within a computer system.

Within system 100, it may be desired to protect data associated with any of hosts 110A-110D and mobile hosts 120A-120D. In order to protect host-associated data, various backup components may operate on hosts 110A-110D and mobile hosts 120A-120D. Turning now to FIG. 2, a generalized block diagram of one embodiment of a backup system 200 that may operate within system 100 is shown. System 200 includes hosts 210, 220, 230, and 240 coupled through network 280 to a backup server 250 and metabase servers 260 and 270. Backup agents 215, 235, and 245 operate on hosts 210, 230, and 240, respectively. In the illustrated embodiment, backup server 250 includes a storage pool 255 in which a copy of data from one or more hosts may be stored. In one embodiment, storage pool 255 may be a single-instance storage pool. In further embodiments, storage pool 255 may be separate from backup server 250. Additional storage pools (not shown) may also be included in system 200, either operated by backup server 250 or by additional backup servers, depending on the storage requirements of the system. In some embodiments, a backup server maybe referred to as a content router. Metabase servers 260 and 270 include metabases 265 and 275 respectively, on which may be stored metadata describing the data stored in storage pool 255.

During operation, backup agents 215, 235, and 245 may perform data backups. For example, in one embodiment data may be conveyed to one or more storage pools and associated metadata conveyed to one or more metabases. Backup frequency may depend on a variety of factors including the urgency of data protection, storage pool capacity, network connection state, and enterprise policies. In one embodiment, backups may be done according to a schedule or at other times determined by administrative policy, security policy, or to meet other requirements of an enterprise.

Figure 3:
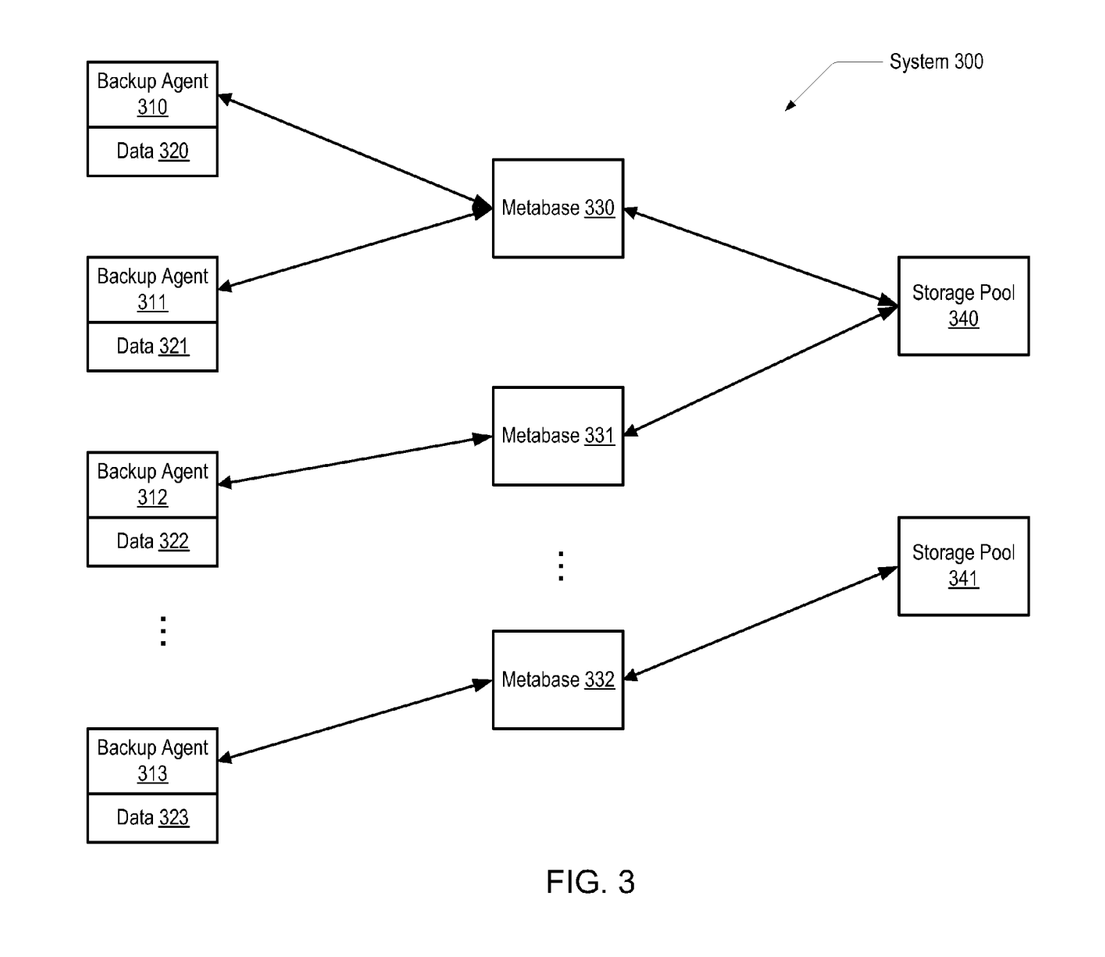
FIG. 3 is a generalized block diagram of one embodiment of a system including backup agents, metabases, and storage pools.

FIG. 3 is a generalized block diagram of one embodiment of a system 300 including backup agents, metabases, and storage pools. System 300 illustrates an association among backup agents, metabases, and storage pools that may operate within systems such as those illustrated in FIGS. 1 and 2. In the illustrated embodiment, system 300 includes backup agents 310, 311, 312, and 313, which are associated with data 320, 321, 322, and 323, respectively. Also included in system 300 are metabases 330, 331, and 332 and storage pools 340 and 341. In alternative embodiments, additional backup agents, metabases, and storage pools may be part of system 300. During operation, backup agents, metabases, and storage pools may be added to system 300. For example, in the illustrated embodiment, backup agents 310 and 320 may be coupled to metabase 330 and storage pool 340. Backup agent 312 may be coupled to metabase 331 and storage pool 340. Metabase 331 may provide additional metadata storage capacity for the use of backup agent 312. At some point during operation, additional backup agent 313 may be added to system 300 along with additional metabase 332 and additional storage pool 341. In the preceding example, each backup agent is associated with only one metabase. In a further embodiment, described below, each backup agent may be associated with more than one metabase. Further, portions of metadata from a single backup agent may be redistributed among multiple metabases. Before describing these embodiments, a more detailed example of the contents of backup agent data and corresponding metadata will be described.

Figure 4:
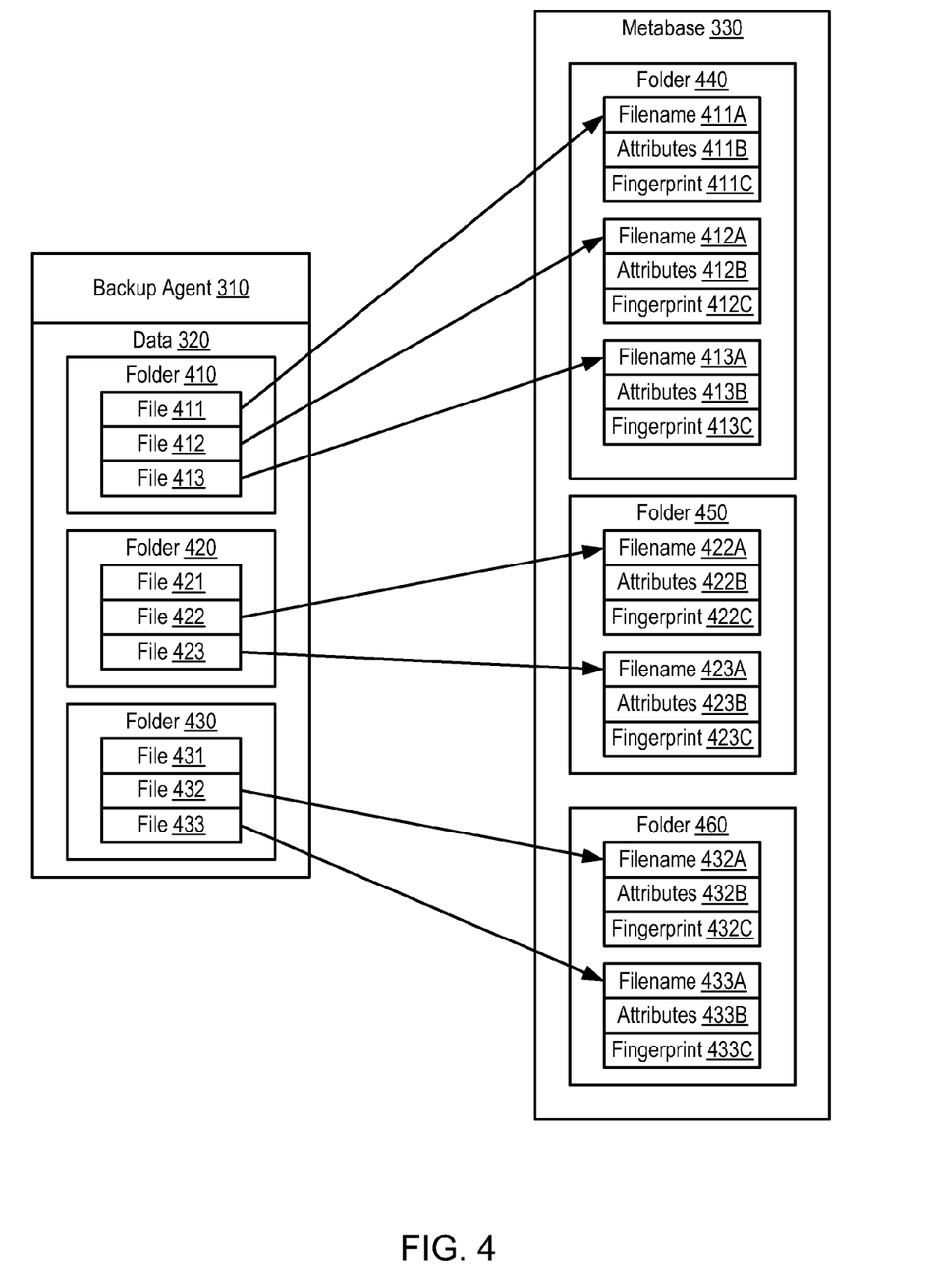
FIG. 4 illustrates one embodiment of data and its associated metadata in a metabase.

FIG. 4 illustrates one embodiment of data 320 and its associated metadata in metabase 330. In the illustrated embodiment, data 320 includes folders 410, 420, and 430. Folder 410 includes files 411-413, folder 420 includes files 421 and 422, and folder 430 includes files 431 and 432. A file, as used herein, may comprise one or more files or other data structures. Also, as used herein, folder may refer to any grouping of data files, such as a directory, a folder, or a data selection such as the output of a filter, etc. Metabase 330 may include a database, tables, or other similar data structures organized into folders 440, 450, and 460 that correspond with folders 410, 420, and 430, respectively. Metadata corresponding to files 411-413 may be stored in folder. In particular, folder 440 may include a filename 411A, attributes 411B, and a fingerprint 411C corresponding to file 411, a filename 412A, attributes 412B, and a fingerprint 412C corresponding to file 412, and a filename 413A, attributes 413B, and a fingerprint 413C corresponding to file 413. Similar metadata corresponding to files 421, 422, 431, and 432 may be stored in folders 450 and 460, as shown.

In one embodiment, filenames such as filename 411A may consist of a user-readable string. However, since multiple files may have the same name, a fingerprint such as fingerprint 411C may also be provided as an unambiguous identifier for each file. A fingerprint, as used herein, refers to a function of a file or a portion of a file such as a hash function. In one embodiment, the fingerprints may be encrypted. More particularly, a fingerprint may comprise a Message-Digest algorithm 5 (MD5) or other hash function. Alternative hash functions include Secure Hash Algorithm (SHA), a checksum, signature data, and any other suitable function, cryptographic, or otherwise, for identifying a data entity. Copies of data entities such as files or file segments may be identified by comparing a fingerprint of one entity to the fingerprint of another entity. If the fingerprints match, then the two entities are copies of each other. In addition to the filename and fingerprint, additional attributes such as attributes 411B may be included in a file's metadata. Attributes may include a variety of information describing the associated data such as one or more of: a data size, batch number, type, version number, ownership, permissions, modification time, error code, etc. Other forms of metadata and/or identifiers will be apparent to those of ordinary skill in the art.

Figure 5:
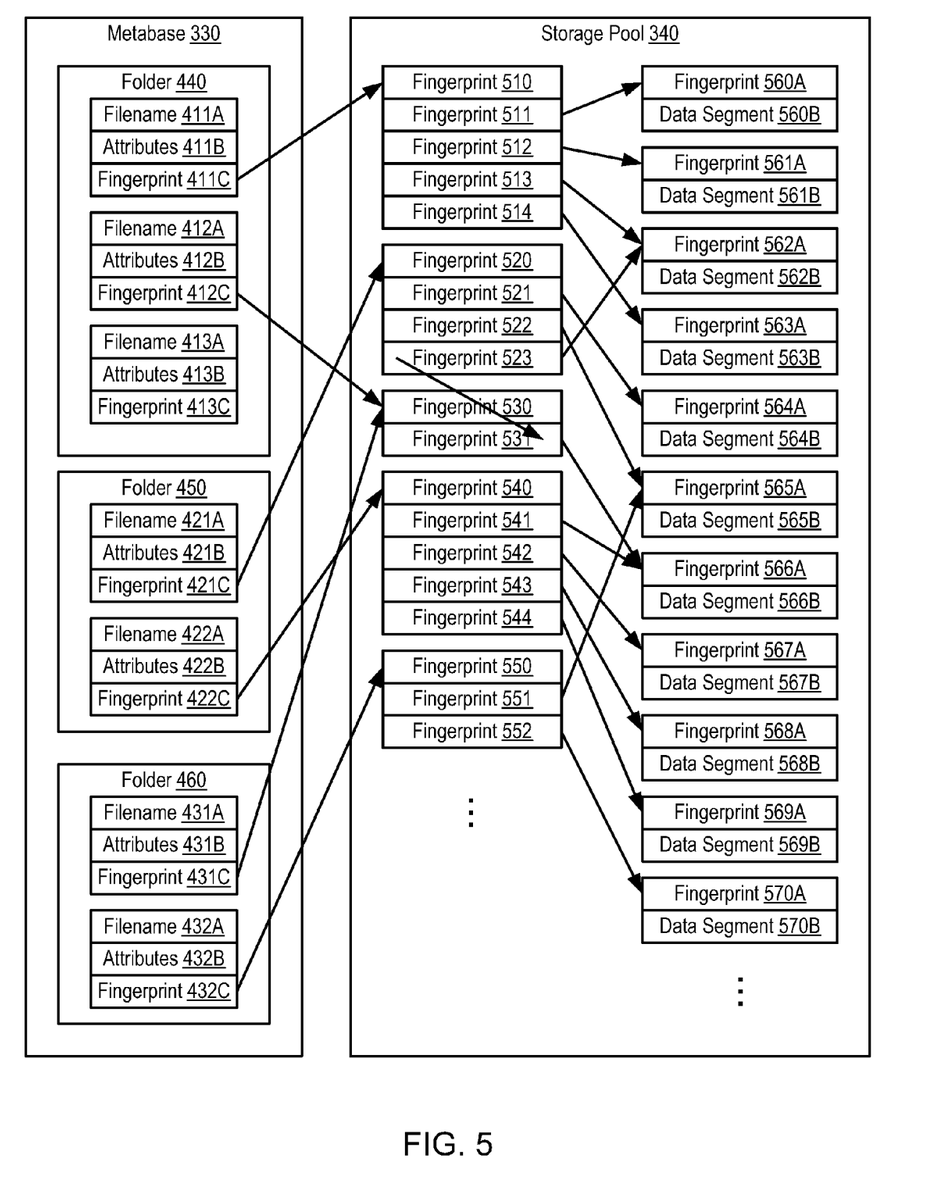
FIG. 5 illustrates one embodiment of a metabase and its associated data in a storage pool.

Turning now to FIG. 5, one embodiment of metabase 330 and its associated data in a storage pool 340 is shown. As previously described, metabase 330 includes folders 440, 450, and 460. Storage pool 340 may include single-instance data segments, data segment fingerprints corresponding to the single-instance data segments, and file fingerprints corresponding to the files from which the data segments are taken. For example, in the illustrated embodiment, storage pool 340 includes fingerprint 560A corresponding to data segment 560B, fingerprint 561A corresponding to data segment 561B, etc. Also included in storage pool 340 are fingerprints 510-514, 520-523, 530-531, 540-544, and 550-552. File fingerprint 510 matches fingerprint 411C of metabase 330, which corresponds to file 411 within data 320. Similarly, file fingerprint 520 matches fingerprint 421C of metabase 330, which corresponds to file 421 within data 320, etc. File fingerprint 510 may be associated with a set of data segment fingerprints 511-514 that correspond to data into which file 411 is segmented during a single-instance storage process. Fingerprints 510 and associated fingerprints 511-514 may be grouped together in a table entry within storage pool 340. Other table entries may hold fingerprints 520-523, 530-531, 540-544, and 550-552.

The relationships among the fingerprints of metabase 330, the file fingerprints of storage pool 340, and the data segment fingerprints of storage pool 340 may be arranged to permit files and their single-instance data segments to be identified and retrieved. For example, metabase 330 may include a fingerprint for each file that is stored in an associated storage pool, including copies of identical files from different sources. In contrast, storage pool 340 may include a single instance of a file fingerprint for one or more copies of identical files, that is, file fingerprints in storage pool 340 may be de-duplicated. More specifically, as shown connecting arrows in FIG. 5, fingerprints 510, 520, and 550 each match one file fingerprint from metabase 330. However, file fingerprint 530 matches both file fingerprint 412C and 431C, indicating that file 412 and file 431 are identical copies of each other. Similarly, file fingerprint 540 matches both file fingerprint 413C and 422C, indicating that file 413 and file 422 are identical copies of each other. In addition to the mapping between file fingerprints from metabase 330 and file fingerprints within a table entry in storage pool 340, there may be mappings between the data segment fingerprints of each table entry and corresponding data segment fingerprints stored with the actual data segments. For instance, fingerprint 511 matches fingerprint 560A, indicating that data segment 560B is a portion of file 411. Similarly, fingerprints 512-514 match fingerprints 561A, 562A, and 563A, respectively. Accordingly, data segments 560B, 561B, 562B, and 563B are the portions of file 411 that are stored in storage pool 340. Similar mappings are shown for the remaining data segments and their associated fingerprints in storage pool 340. Since storage pool 340 may be a single-instance storage pool, any given data segment may be a copy of a data segment from more than one file, that is, data segment fingerprints within storage pool 340 may be de-duplicated. For example, fingerprints 513 and 523 match fingerprint 562A, indicating that data segment 562B is a copy of a segment of both file 411 and file 421. Also, fingerprint 566A matches fingerprints 531 and 541. Since fingerprint 531 is associated with file fingerprint 530, fingerprint 541 is associated with file fingerprint 540, fingerprint 530 matches file fingerprints 412C and 431C, and fingerprint 540 matches file fingerprints 413C and 422C, then data segment 566B is a copy of a segment of files 412, 413, 422, and 431. Other similar relationships between data segments and the files from which they are taken will be apparent to those skilled in the art, upon examination of FIG. 5.

Figure 6:
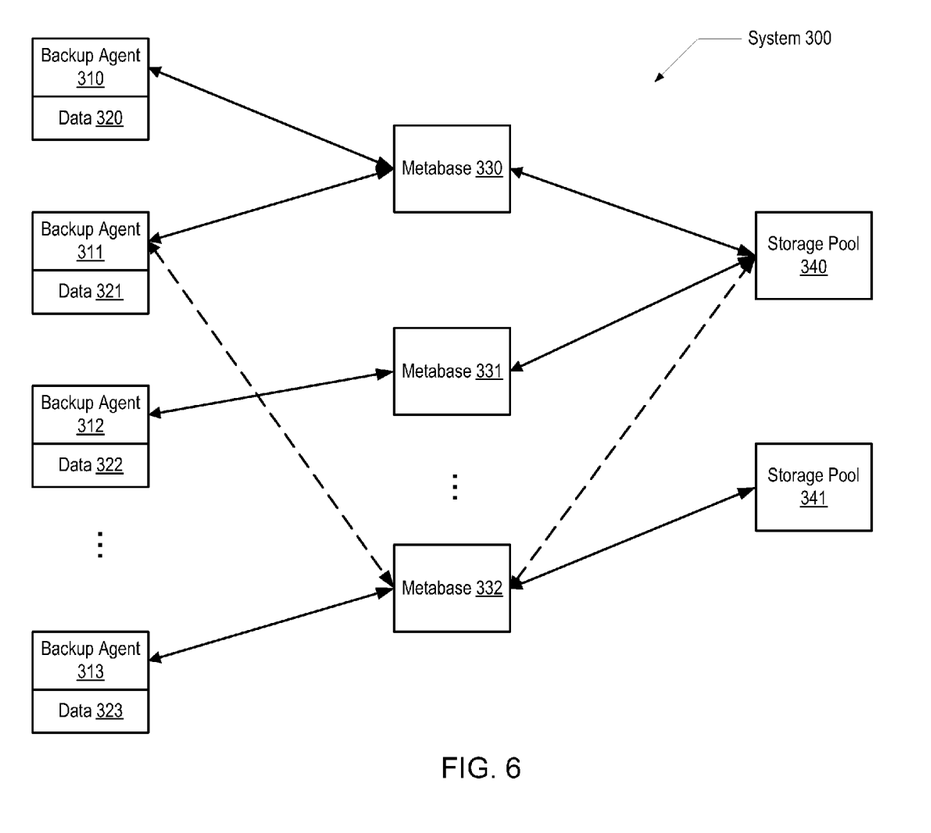
FIG. 6 illustrates one embodiment of a system in which metadata may be redistributed.

Having described the structure and organization of one embodiment of a metabase and a storage pool storing data for a backup agent, attention will now turn to redistribution of metadata among metabases. FIG. 6 illustrates one embodiment of system 300 in which metadata may be redistributed. FIG. 6 differs from FIG. 3, in that links between backup agent 311 and metabase 332 and between storage pool 340 and metabase 332 have been added. These additional links indicate that at least portions of the metadata associated with backup agent 311 and data 321 may be stored in metabase 330 and in metabase 332. For example, in one embodiment, if metabase 330 has insufficient capacity for storing additional data when backup agent 311 attempts a backup operation, metadata may be redistributed to metabase 332. In an alternative embodiment, metadata associated with backup agent 311 and data 321 may be moved from metabase 330 to metabase 332 to make room for metadata from another backup agent in metabase 330.

Figure 7:
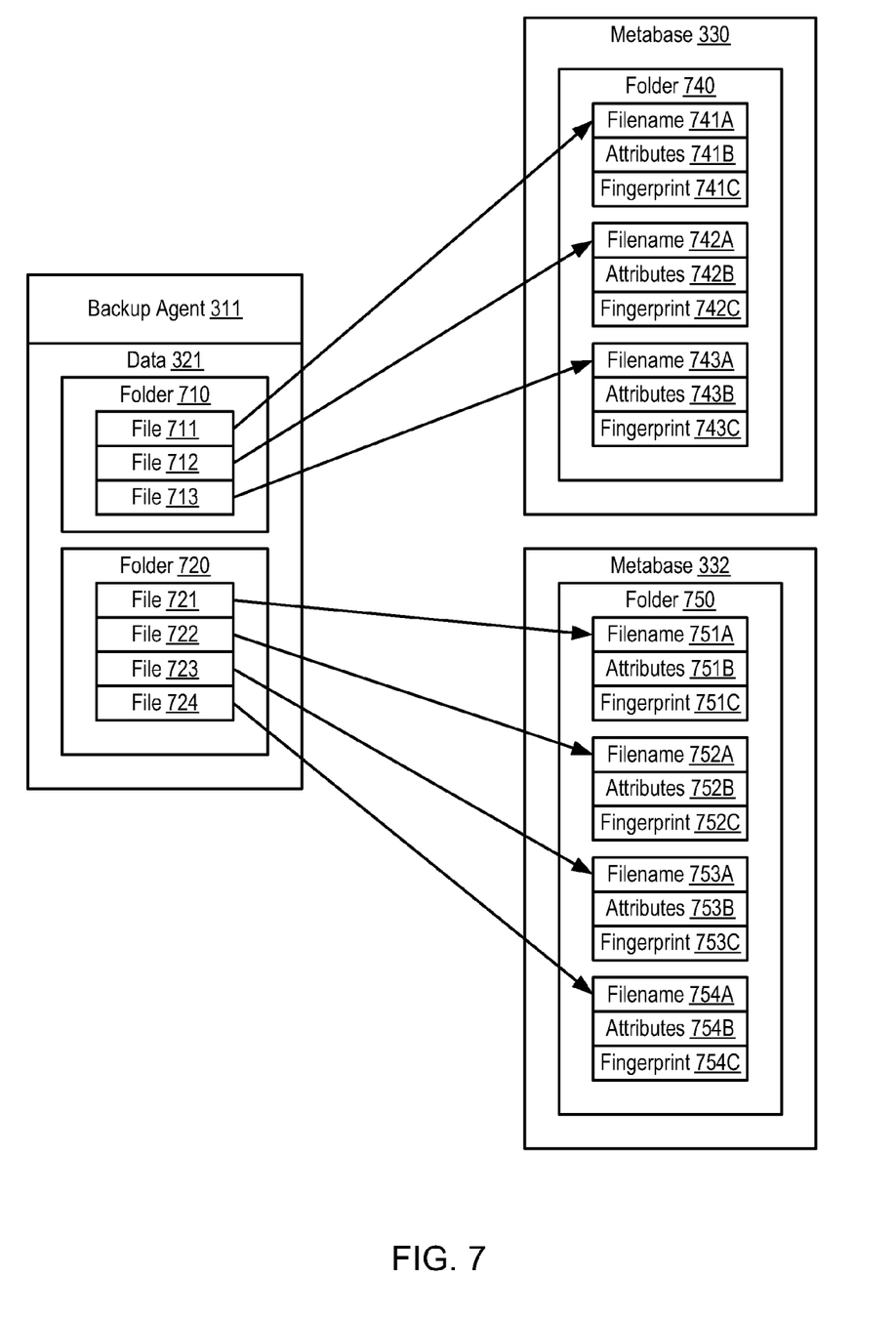
FIG. 7 illustrates one embodiment of data and its associated metadata distributed between two metabases.

FIG. 7 illustrates one embodiment of data 321 and its associated metadata distributed between metabases 330 and 332. In the illustrated embodiment, data 321 includes folders 710 and 720. Folder 710 includes files 711-713 and folder 720 includes files 721-724. Metabase 330 may includes a folder 740 corresponding to folder 710. Metabase 332 includes a folder 750 corresponding to folder 720. Metadata corresponding to files 711-713 is stored in folder 740 of metabase 330 and metadata corresponding to files 721-724 is stored in folder 750 of metabase 332. In particular, folder 740 includes a filename 741A, attributes 741B, and a fingerprint 741C corresponding to file 711, a filename 742A, attributes 742B, and a fingerprint 742C corresponding to file 712, and a filename 743A, attributes 743B, and a fingerprint 743C corresponding to file 713. Folder 750 includes a filename 751A, attributes 751B, and a fingerprint 751C corresponding to file 721, a filename 752A, attributes 752B, and a fingerprint 752C corresponding to file 722, and a filename 753A, attributes 753B, and a fingerprint 753C corresponding to file 723, etc. It is noted that in this embodiment, metadata associated with data 321 is distributed between metabases 330 and 332, but metadata from a given folder within data 321 is not split between metabases.

Figure 8:
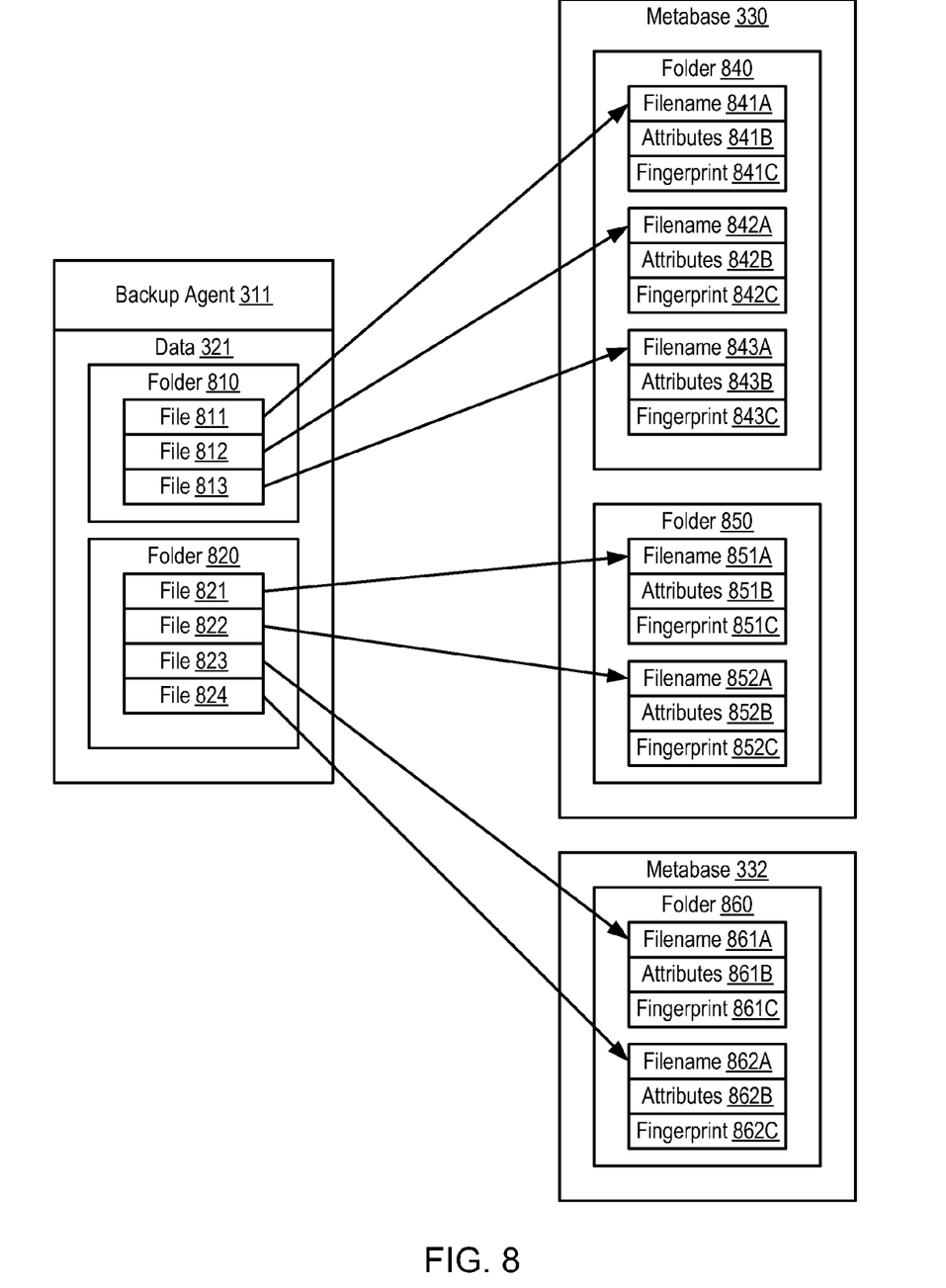
FIG. 8 illustrates an alternative embodiment of data and its associated metadata distributed between two metabases.

FIG. 8 illustrates an alternative embodiment of data 321 and its associated metadata distributed between metabases 330 and 332. In contrast to the embodiment illustrated in FIG. 7, metadata from a given folder within data 321 may be split between metabases. In the illustrated embodiment, data 321 includes folders 810 and 820. Folder 810 includes files 811-813 and folder 820 includes files 821-824. Metabase 330 may includes a folder 840 corresponding to folder 810 and a folder 850 corresponding to a portion of folder 820. Metabase 332 includes a folder 860 corresponding to different portion of folder 820. Metadata corresponding to files 811-813 is stored in folder 840 of metabase 330 and metadata corresponding to files 821 and 822 is stored in folder 850 of metabase 330. In particular, folder 840 includes a filename 841A, attributes 841B, and a fingerprint 841C corresponding to file 811, a filename 842A, attributes 842B, and a fingerprint 842C corresponding to file 812, and a filename 843A, attributes 843B, and a fingerprint 843C corresponding to file 813. Folder 850 includes a filename 851A, attributes 851B, and a fingerprint 851C corresponding to file 821 and a filename 852A, attributes 852B, and a fingerprint 852C corresponding to file 822. Metadata corresponding to files 823-824 is stored in folder 860 of metabase 332. In particular, folder 860 includes a filename 861A, attributes 861B, and a fingerprint 861C corresponding to file 823 and a filename 862A, attributes 862B, and a fingerprint 862C corresponding to file 824.

Figure 9:
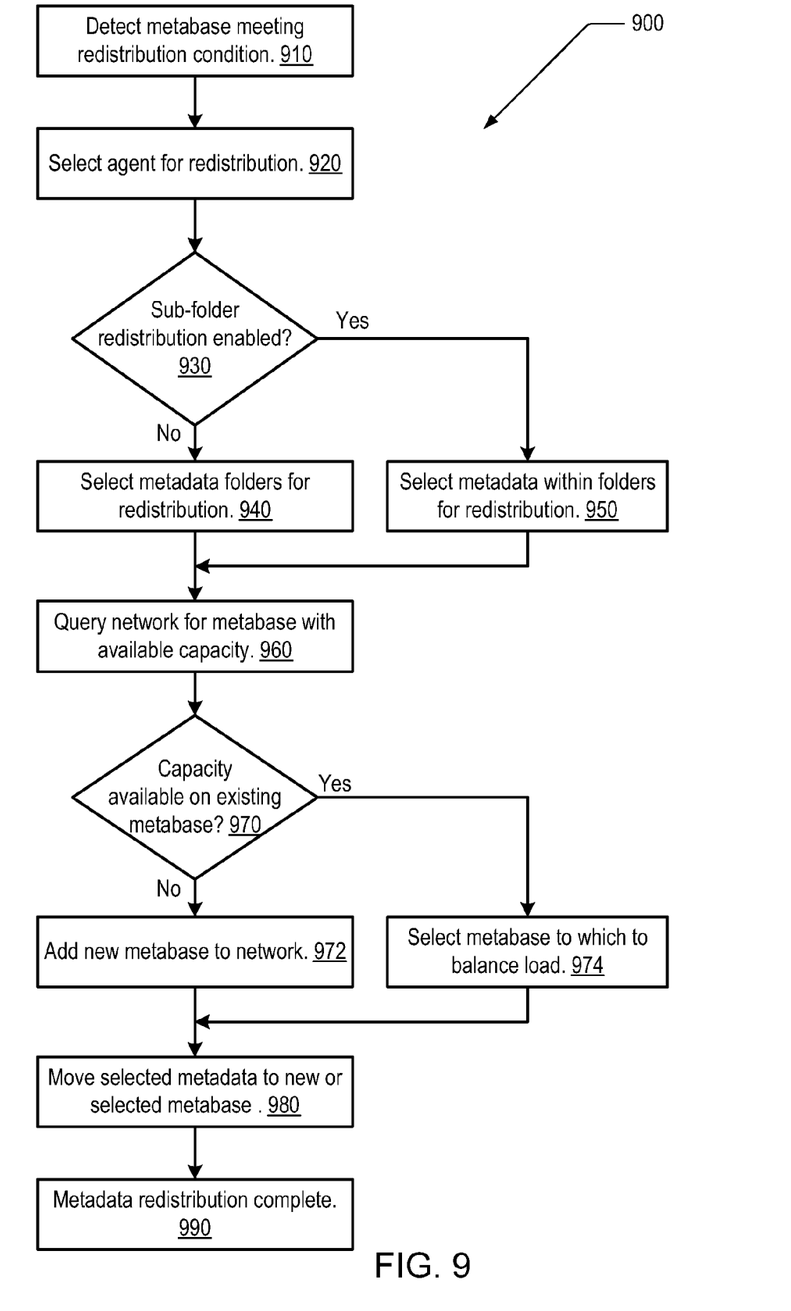
FIG. 9 illustrates one embodiment of a process for redistributing metadata among metabases.

FIG. 9 illustrates one embodiment of a process 900 for redistributing metadata among metabases. Process 900 may begin with the detection of a metabase meeting one or more conditions under which redistribution is desired (block 910). For example, redistribution may be desired if the amount of metadata stored in a metabase reaches a threshold value. Alternatively, redistribution may be desired to balance the load among two or more metabases. A threshold value may be a percentage of the total capacity of the metabase, such as 75%, etc. A determination that redistribution is desired may be made by an individual metabase, by a storage pool authority, or by some other suitable server process. Once a determination that redistribution is desired, an agent may be selected (block 920). Metadata associated with the selected agent may be redistributed from one metabase to another. If redistribution of metadata at a sub-folder level is not enabled for the selected agent's metadata (decision block 930), then one or more metabase folders and their contents may be selected for redistribution (block 940). If redistribution of metadata at a sub-folder level is enabled for the selected agent's metadata (decision block 930), then one or more metadata entries within one or more metabase folders may be selected for redistribution (block 950).

Once metadata that is to be redistributed has been selected, a target metabase may be selected. In the illustrated embodiment, a query may be sent to any hosts connected to the system to determine if a metabase is available that has sufficient capacity to store the selected metadata (block 960). If there is not sufficient capacity on a metabase that is already connected to the system (decision block 970), then a new metabase may be added to the system (block 972). If there is sufficient capacity on a metabase that is already connected to the system (decision block 970), then one or more already connected metabase may be selected to which to balance the load of metadata storage (block 974). The selected metadata may then be moved to the new or selected metabase (block 980). Once the selected metadata has been moved to the new or the selected metabase, metadata redistribution is complete (block 990).

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
one or more storage pools;
a plurality of hosts coupled to said one or more storage pools via a network; and
at least a first metabase server comprising a metabase coupled to at least one storage pool of said one or more storage pools via a network and coupled to a first host and a second host of said plurality of hosts via a network,
wherein said metabase comprises metadata for both the first host and the second host of the plurality of hosts; and
wherein each of the first host and the second host is configured to:
convey data to one or more of said storage pools via said network; and
store metadata associated with said data in said metabase;
wherein in response to detecting an amount of metadata stored in the first metabase has reached a threshold value, the system is configured to:
generate a query to discover whether there are metabases other than the first metabase coupled to the system that have capacity available for storing additional metadata;
identify a second metabase of a second metabase server as being a metabase that has capacity available for storing additional metadata, responsive to said query;
identify one or more hosts of the plurality of hosts that have metadata stored in said first metabase;
select a particular host of the one or more hosts for redistribution;
add a connection link between the second metabase server and the particular host responsive to selecting said particular host for redistribution, wherein the second metabase server is different from the first metabase server;
redistribute at least a portion of the metadata associated with the particular host from the first metabase server to the second metabase of the second metabase server; and
configure the particular host to utilize the second metabase server for accesses to said at least a portion of the metadata instead of the first metabase server.

2. The system as recited in claim 1,
wherein the metadata comprises a plurality of entries, each entry corresponding to a data file; and
wherein each entry includes a file fingerprint that unambiguously identifies the corresponding data file.

3. The system as recited in claim 2, wherein the file fingerprints are encrypted.

4. The system as recited in claim 2, wherein a first storage pool of the storage pools is configured to:
store a first file as one or more data segments;
associate a data segment fingerprint with each of the data segments;
de-duplicate the data segments in the first storage pool; and
maintain an entry in a table which includes:
a file fingerprint of the first file; and
one or more data segment fingerprints corresponding to the one or more data segments.

5. The system as recited in claim 1,
wherein the first host is configured to store data in a plurality of folders;
wherein a first portion of metadata associated with data from a first folder of the folders is included in said at least a portion of the metadata; and
wherein a second portion of the metadata associated with data from the first folder of the folders is not redistributed from the first metabase.

6. A method for redistributing metadata across metabases, the method comprising:

conveying data from a plurality of hosts to one or more storage pools, wherein said plurality of hosts are coupled to said one or more storage pools via a network;

storing metadata associated with said data in a metabase included in a first metadata server, wherein said metabase is coupled to at least one storage pool of said one or more storage pools via a network and coupled to a first host and a second host of said plurality of hosts via a network, wherein said metabase comprises metadata for both a first host and a second host of the plurality of hosts;

detecting that an amount of data stored in said metabase has reached a threshold value;

wherein in response to said detecting:
- generating a query to discover whether there are metabases other than the first metabase coupled to the system that have capacity available for storing additional metadata;
- identifying a second metabase of a second metabase server as being a metabase that has capacity available for storing additional metadata, responsive to said query;
- identifying one or more hosts of the plurality of hosts that have metadata stored in said first metabase;
- selecting a particular host of the one or more hosts for redistribution;
- adding a connection link between the second metabase server and the particular host responsive to selecting said particular host for redistribution, wherein the second metabase server is different from the first metabase server;
- redistributing at least a portion of the metadata associated with the particular host from the first metabase server to the second metabase of the second metabase server; and
- configuring the particular host to utilize the second metabase server for accesses to said at least a portion of the metadata instead of the first metabase server.

7. The method as recited in claim 6,
wherein the metadata comprises a plurality of entries, each entry corresponding to a data file; and
wherein each entry includes a file fingerprint that unambiguously identifies the corresponding data file.

8. The method as recited in claim 7, wherein the file fingerprints identifying the data files are encrypted.

9. The method as recited in claim 7, further comprising:
storing a first file as one or more data segments;
associating a data segment fingerprint with each of the data segments;
de-duplicating the data segments in the first storage pool; and
maintaining an entry in a table which includes:
- a file fingerprint of the first file; and
- one or more data segment fingerprints corresponding to the one or more data segments.

10. The method as recited in claim 6, further comprising redistributing metadata to balance a load of metadata stored in two or more metabases.

11. A computer readable medium storing computer instructions that are executable by a processor to:
convey data from a plurality of hosts to one or more storage pools, wherein said plurality of hosts are coupled to said one or more storage pools via a network;

store metadata associated with said data in a metabase included in a first metadata server, wherein said metabase is coupled to at least one storage pool of said one or more storage pools via a network and coupled to a first host and a second host of said plurality of hosts via a network, wherein said metabase comprises metadata for both a first host and a second host of the plurality of hosts;

detect that an amount of data stored in said metabase has reached a threshold value;

wherein in response to said detection:
- generate a query to discover whether there are metabases other than the first metabase coupled to the system that have capacity available for storing additional metadata;
- identify a second metabase of a second metabase server as being a metabase that has capacity available for storing additional metadata, responsive to said query;
- identify one or more hosts of the plurality of hosts that have metadata stored in said first metabase;
- select a particular host of the one or more hosts for redistribution;
- add a connection link between the second metabase server and the particular host, wherein the second metabase server is different from the first metabase server;
- redistribute at least a portion of the metadata associated with the particular host from the first metabase server to the second metabase of the second metabase server; and
- configure the particular host to utilize the second metabase server for accesses to said at least a portion of the metadata instead of the first metabase server.

12. The computer readable medium as recited in claim 11,
wherein the metadata comprises a plurality of entries, each entry corresponding to a data file; and
wherein each entry includes a file fingerprint that is derived from and unambiguously identifies the corresponding data file.

13. The computer readable medium as recited in claim 12, wherein the file fingerprints identifying the data files are encrypted.

14. The computer readable medium as recited in claim 12, wherein the instructions are further executable to:
store a first file as one or more data segments;
associate a data segment fingerprint with each of the data segments;
de-duplicate the data segments in the first storage pool; and
maintain an entry in a table which includes:
- a file fingerprint of the first file; and
- one or more data segment fingerprints corresponding to the one or more data segments.

15. The system as recited in claim 1, wherein data of the particular host that is associated with given metadata redistributed from the first metabase to the second metabase is stored in a first storage pool of the one or more storage pools both before and after the given metadata is redistributed from the first metabase to the second metabase.

* * * * *